United States Patent
Hodono

(10) Patent No.: US 8,168,376 B2
(45) Date of Patent: May 1, 2012

(54) MANUFACTURING METHOD OF OPTICAL WAVEGUIDE DEVICE

(75) Inventor: Masayuki Hodono, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 635 days.

(21) Appl. No.: 12/357,669

(22) Filed: Jan. 22, 2009

(65) Prior Publication Data

US 2009/0186305 A1    Jul. 23, 2009

Related U.S. Application Data

(60) Provisional application No. 61/028,675, filed on Feb. 14, 2008.

(30) Foreign Application Priority Data

Jan. 22, 2008  (JP) .................................. 2008-011885

(51) Int. Cl.
 *G03F 7/20* (2006.01)
(52) U.S. Cl. ....................................... 430/321
(58) Field of Classification Search ........................ None
 See application file for complete search history.

(56) References Cited

U.S. PATENT DOCUMENTS

| | | | | |
|---|---|---|---|---|
| 4,268,113 A * | 5/1981 | Noel, Jr. | ............................ | 385/92 |
| 4,636,647 A * | 1/1987 | Nishizawa | ..................... | 250/551 |
| 5,434,939 A * | 7/1995 | Matsuda | ......................... | 385/88 |
| 5,751,350 A * | 5/1998 | Tanaka | ..................... | 348/231.99 |
| 6,408,120 B1 * | 6/2002 | Dautartas | ......................... | 385/52 |
| 6,626,585 B1 | 9/2003 | Malone | | |
| 7,085,300 B2 * | 8/2006 | Werner et al. | ................. | 372/50.1 |
| 2002/0102072 A1 * | 8/2002 | Chan et al. | ........................ | 385/89 |
| 2003/0098511 A1 | 5/2003 | Moon et al. | | |
| 2004/0023437 A1 * | 2/2004 | Moon et al. | .................... | 438/108 |
| 2004/0036135 A1 * | 2/2004 | Yang et al. | ..................... | 257/433 |
| 2004/0037507 A1 * | 2/2004 | Marion et al. | ................... | 385/52 |

(Continued)

FOREIGN PATENT DOCUMENTS

JP           05-243720       *   9/1993

(Continued)

OTHER PUBLICATIONS

Chinese Office Action dated May 18, 2011, issued in corresponding Chinese Patent Application No. 200910008428.

(Continued)

*Primary Examiner* — Martin Angebranndt
(74) *Attorney, Agent, or Firm* — Westerman, Hattori, Daniels & Adrian, LLP

(57) ABSTRACT

A method of manufacturing an optical waveguide device which is capable of connecting light-receiving and light-emitting elements mounted on a board and an optical waveguide to each other with high accuracy. Insulation layers are formed on a first surface of a metal substrate. A first photomask is positioned by using an alignment mark formed in the metal substrate, and exposure to light and development are performed to form conductor layers. A second photomask is positioned on a second surface of the metal substrate opposite from the first surface by similarly using the above-mentioned alignment mark, and exposure to light and development are performed to form an opening for optical coupling between a light-emitting element and an optical waveguide film. The light-emitting element is mounted on pads of the conductor layers, and the optical waveguide film is fixed to the metal substrate using the optical coupling opening.

5 Claims, 6 Drawing Sheets

U.S. PATENT DOCUMENTS

| | | | |
|---|---|---|---|
| 2005/0105860 A1* | 5/2005 | Oono et al. | 385/88 |
| 2006/0028926 A1 | 2/2006 | Terada et al. | |
| 2006/0210213 A1* | 9/2006 | Huang et al. | 385/14 |
| 2006/0263003 A1* | 11/2006 | Asai et al. | 385/14 |
| 2009/0208167 A1* | 8/2009 | Hodono | 385/14 |
| 2009/0245720 A1* | 10/2009 | Choki et al. | 385/14 |
| 2009/0261488 A1* | 10/2009 | Shimizu | 264/1.29 |
| 2009/0269704 A1* | 10/2009 | Hodono | 430/319 |
| 2010/0104246 A1* | 4/2010 | Hodono | 385/88 |

FOREIGN PATENT DOCUMENTS

| | | | |
|---|---|---|---|
| JP | 2000-349307 A | | 12/2000 |
| JP | 2006-100525 | * | 4/2006 |
| JP | 2006-154553 A | | 6/2006 |

OTHER PUBLICATIONS

European Search Report dated Jun. 2, 2009, issued in corresponding European Patent Application No. 09000528.1.

* cited by examiner

PRIOR ART

MANUFACTURING METHOD OF OPTICAL WAVEGUIDE DEVICE

RELATED APPLICATIONS

This application claims the benefit of U.S. Provisional Application No. 61/028,675, filed Feb. 14, 2008, which is hereby incorporated by reference.

BACKGROUND OF THE INVENTION

1. Field of the Invention

The present invention relates to a method of manufacturing an optical waveguide device which has found wide use in a variety of electric and electronic technologies using optics such as optical communications, optical information processing and the like.

2. Description of the Related Art

In general, an optical waveguide device achieves optical coupling by causing an optical waveguide to propagate a light beam emitted from a light-emitting element or causing a light-receiving element to receive a light beam propagated by the optical waveguide. For the coupling, it is important to set their optical axes coaxially, and high positioning accuracy is required. Recently, an optical waveguide device (including an optical module) having a receptacle structure capable of easily accomplishing such positioning has been proposed and used widely for optical communications and the like (see Japanese Patent Application Laid-Open No. 2006-154553) (Patent Document 1).

As shown in FIG. 6, for example, an optical module described in Patent Document 1 includes a board 2 with an optical element 1 such as a planar light-emitting element mounted thereon, and a receptacle capable of positioning a flexible optical waveguide 3 so that the flexible optical waveguide 3 lies on the same optical axis as the above-mentioned optical element 1.

The above-mentioned receptacle 4 is composed of a first receptacle part 6 provided with a lower groove 5 serving as a guide way for the positioning of the flexible optical waveguide 3, and a second receptacle part 8 provided with an upper groove 7 similarly serving as a guide way. The first receptacle part 6 and the second receptacle part 8 are assembled together into a single unit by fitting guide pins 9 and 10 mounted upright on the upper surface of the board 2 into guide holes 11 and 12 provided in the lower surfaces of the above-mentioned first receptacle part 6 and second receptacle part 8, respectively.

However, the formation of the receptacle structure of this optical module requires the step of producing the two parts, i.e. the first receptacle part 6 and the second receptacle part 8, and the step of assembling these parts on the board 2, presents the problem of requiring cumbersome and complicated labor. Additionally, since the positioning of the optical element 1 and the flexible optical waveguide 3 is accomplished by the above-mentioned assembled receptacle structure, the accumulation of the machining accuracy and assembly accuracy of the plurality of members influences the entire accuracy. Thus, there arises another problem in that it is not easy to adjust the entire accuracy.

To provide the plurality of members constituting the receptacle structure with high dimensional accuracy, it is necessary to mold a resin containing an expensive solid filler (having a size ranging from several to tens of microns, and monodisperse) in high concentration with a die manufactured with high dimensional accuracy. This presents still another problem in requiring not only high material costs but also high running costs of the die because the die is prone to be damaged due to the above-mentioned solid filler.

SUMMARY OF THE INVENTION

In view of the foregoing, it is an object of the present invention to provide an excellent method of manufacturing an optical waveguide device which is capable of connecting light-receiving and light-emitting elements mounted on a board and an optical waveguide to each other with high accuracy by using an easy and mass-producible method at relatively low costs.

To accomplish the above-mentioned object, a first aspect of the present invention is intended for a method of manufacturing an optical waveguide device, which comprises the steps of: forming an alignment mark for photomask alignment in a metal substrate having a first surface with an insulation layer formed thereon; coating the first surface of said metal substrate with a first photosensitive resin layer; exposing the coated surface to light and developing the coated surface, with a first photomask positioned relative to the coated surface by using said alignment mark, to transfer a conductor pattern including pads for mounting of light-receiving and light-emitting elements onto said first photosensitive resin layer, thereby removing an unnecessary portion of said first photosensitive resin layer; forming a conductor layer along the conductor pattern uncovered by the removal of the unnecessary portion of said first photosensitive resin layer; coating a second surface of said metal substrate opposite from the first surface with a second photosensitive resin layer; exposing the coated surface to light and developing the coated surface, with a second photomask positioned relative to the coated surface by using said alignment mark, to transfer an optical coupling opening pattern onto said second photosensitive resin layer, thereby removing an unnecessary portion of said second photosensitive resin layer; and performing an opening formation process on the metal substrate along the optical coupling opening pattern uncovered by the removal of the unnecessary portion of said second photosensitive resin layer to form an optical coupling opening, wherein, after the light-receiving and light-emitting elements are mounted on the pads of said conductor layer, said light-receiving and light-emitting elements and an optical waveguide are optically coupled to each other by using said optical coupling opening.

In particular, a second aspect of the present invention is intended for a method of manufacturing an optical waveguide device, wherein a multi-mode optical waveguide film is used as said optical waveguide, and a slit-shaped opening is formed as said optical coupling opening; and wherein, after the light-receiving and light-emitting elements are mounted on the pads of said conductor layer, one end of said multi-mode optical waveguide film is inserted into and fixed in said slit-shaped optical coupling opening, whereby said light-receiving and light-emitting elements and the optical waveguide are optically coupled to each other. A third aspect of the present invention is intended for a method of manufacturing an optical waveguide device, wherein an optical waveguide film having an end portion provided with an MT connector is used as said optical waveguide, and a through hole for receiving a pin specifically designed for attachment of said MT connector is formed in a manner similar to the formation of said optical coupling opening at the same time as the optical coupling opening; and wherein, after the light-receiving and light-emitting elements are mounted on the pads on said metal substrate, the pin specifically designed for attachment of said MT connector is inserted into said through hole to attach and fix the MT connector, whereby said light-receiving and light-emitting elements and the optical waveguide are optically coupled to each other.

The present inventor has diligently made studies of a method of connecting the light-receiving and light-emitting elements and the optical waveguide to each other easily at relatively low costs while the light-receiving and light-emitting elements and the optical waveguide are positioned with high accuracy. As a result, the present inventor has found that the light-receiving and light-emitting elements and the optical waveguide are positioned relative to each other easily and precisely by the following process: previously forming the alignment mark for photomask alignment in the metal substrate, transferring the conductor pattern including the pads for the mounting of the light-receiving and light-emitting elements by photolithography using the alignment mark to form the conductor layer, and similarly transferring the opening pattern for optical coupling with the optical waveguide by photolithography to form the opening. Thus, the present inventor has attained the present invention.

In the method of manufacturing the optical waveguide device according to the present invention as described above, the alignment mark for photomask alignment is previously formed in the metal substrate. The conductor layer is formed by transferring the conductor pattern including the pads for the mounting of the light-receiving and light-emitting elements by photolithography using the alignment mark. Similarly, the opening is formed by transferring the opening pattern for optical coupling with the optical waveguide by photolithography. This allows the light-receiving and light-emitting elements and the optical waveguide to be positioned relative to each other easily and precisely and to be optically coupled to each other with high accuracy. Therefore, the present manufacturing method eliminates the conventional cumbersome and complicated labor to offer the advantage of significantly reducing manufacturing costs and operating time.

The above-mentioned manufacturing method in which, in particular, the multi-mode optical waveguide film is used as the above-mentioned optical waveguide and the slit-shaped opening is formed as the above-mentioned optical coupling opening offers the advantage of achieving a multiplicity of optical couplings at one time easily and precisely.

The above-mentioned manufacturing method in which, in particular, the optical waveguide film having the end portion provided with the MT connector is used as the above-mentioned optical waveguide and the through hole for receiving the pin specifically designed for attachment of the MT connector is formed at the same time as the above-mentioned optical coupling opening eliminates the need to provide the step of forming a hole for receiving the pin specifically designed for attachment of the MT connector in the substrate to offer the advantage of achieving the optical coupling between a commercially available MT connector and the light-receiving and light-emitting elements easily and precisely.

DETAILED DESCRIPTION

Next, example embodiments for carrying out the present invention will be described in detail using an example in which an optical waveguide device is manufactured by optically coupling a light-emitting element and an optical waveguide to each other.

Figure 1A:
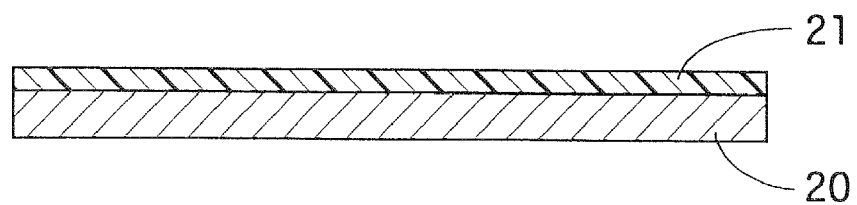
FIGS. 1(a) to (d) are illustrations schematically showing manufacturing steps of an optical waveguide device according to one preferred embodiment of the present invention.

According to this example, as shown in FIG. 1(a) a metal substrate 20 of a flat shape is initially prepared, and a first photosensitive resin layer 21 made of a photosensitive polyimide resin, a photosensitive polyamide resin, a photosensitive epoxy resin, a photosensitive silicone resin or the like is formed on a first surface of the metal substrate 20. Preferably, stainless steel (SUS and the like) is used as the material of the above-mentioned metal substrate 20. The thickness of the metal substrate 20 is set as appropriate depending on the intended use of the optical waveguide device, but it is preferred that the thickness of the metal substrate 20 is typically 1 to 5 mm. It is also preferred that the thickness of the above-mentioned first photosensitive resin layer 21 is typically 3 to 20 μm.

Figure 1B:
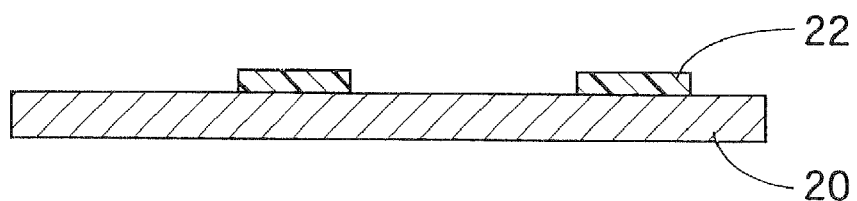

To form insulation layers with a predetermined arrangement from the above-mentioned first photosensitive resin layer 21 by photolithography, exposure to light is performed by using a first photomask, and lower-layer post-exposure bake (PEB) is thereafter performed to make a difference in solubility between the photosensitive resin in an exposed portion and the photosensitive resin in an unexposed portion. Then, developing the photosensitive resin removes the unexposed portion, and post-bake is performed by heating. Thus, insulation layers 22 with the predetermined arrangement are formed on the metal substrate 20, as shown in FIG. 1(b).

Figure 1C:
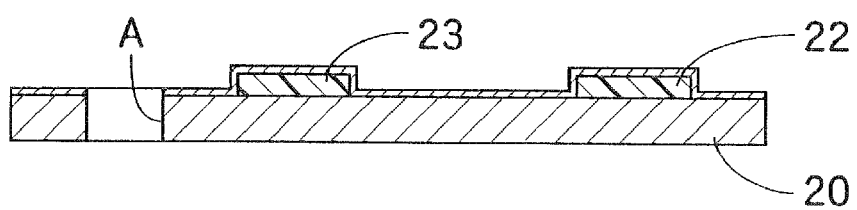

Next, as shown in FIG. 1(c), a seed layer 23 for the formation of metal plating is formed over the entire first surface of the metal substrate 20 on which the above-mentioned insulation layers 22 are formed, for example, by using a thin metal film formation apparatus such as a sputtering apparatus. Thereafter, an alignment mark (through hole) A for photomask positioning is formed in a predetermined position of this metal substrate 20 by punching or blanking using a precision metal mold.

The material of the above-mentioned seed layer 23 used herein is an appropriate material depending on plating metal for use in a metal plating step to be described later. For example, when the plating metal is Cu, Cu/NiCr is preferably used as the material of the seed layer 23.

Figure 1D:
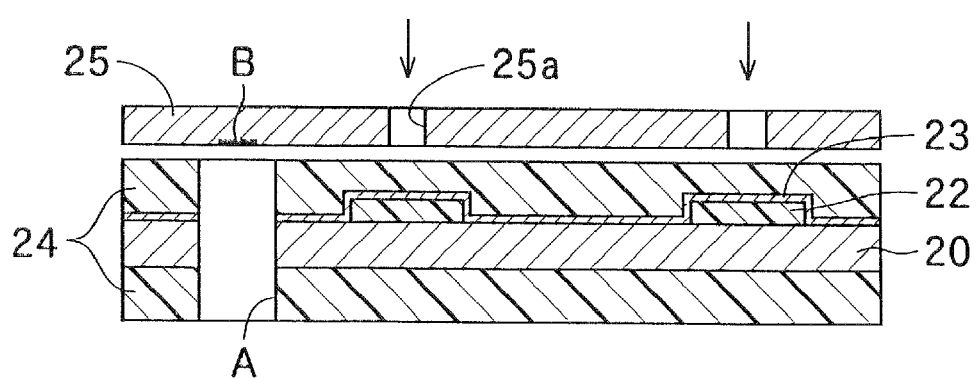

Next, a dry film resist (DFR) (a second photosensitive resin layer) 24 is laminated to opposite surfaces of the metal substrate 20 formed with the insulation layers 22, the seed layer 23 and the alignment mark A described above, as shown in FIG. 1(d). Thereafter, the first surface of the metal substrate 20 on which the insulation layers 22 and the seed layer 23 described above are formed is exposed to light, with a second photomask 25 positioned relative to the first surface of the metal substrate 20. This transfers a transfer pattern 25a (which is a conductor pattern including light-receiving and light-emitting element mounting pads) formed as openings in the second photomask 25 onto the dry film resist 24. At this time, alignment is performed between the alignment mark A in the metal substrate 20 and an alignment mark B provided in the second photomask 25 to accomplish the precise positioning of the second photomask 25 relative to the metal substrate 20. Transferred portions 26 formed in the dry film resist 24 by the above-mentioned exposure to light are cross-hatched in FIG. 2(a).

Figure 2:
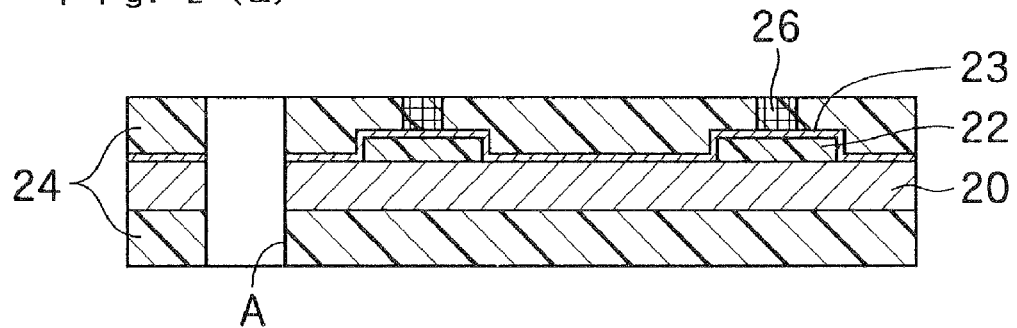
FIGS. 2(a) to (d) are illustrations schematically showing manufacturing steps of the above-mentioned optical waveguide device.
Figure 2:
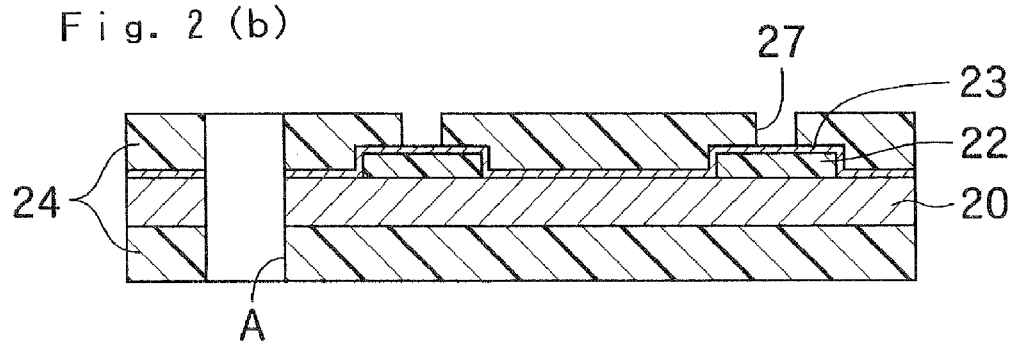
Figure 2:
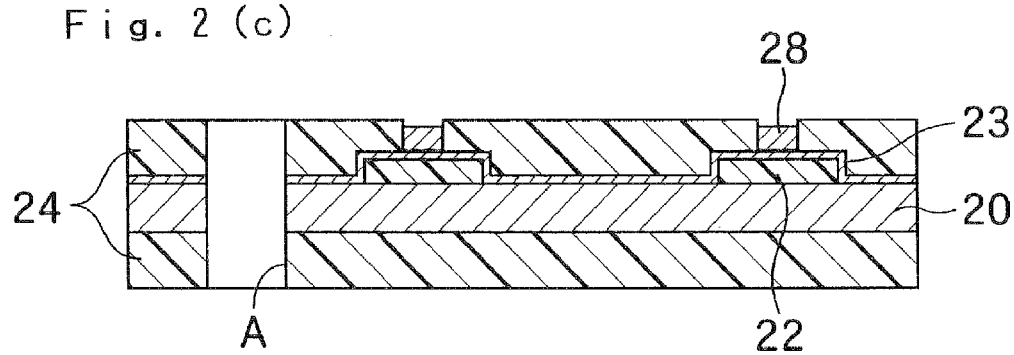
Figure 2:
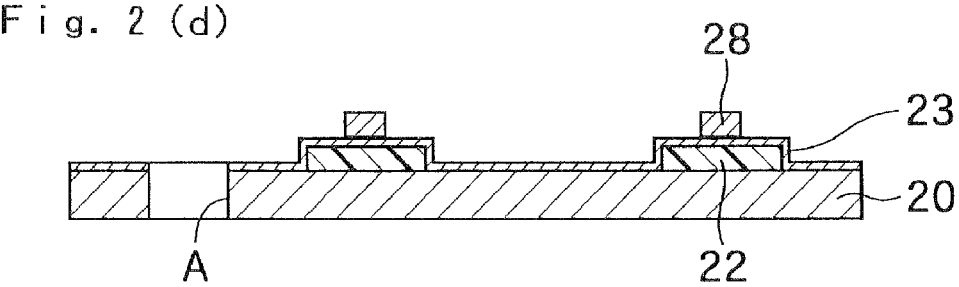

A developing solution is used to dissolve away the above-mentioned transferred portions 26 in the dry film resist 24, thereby developing a recessed conductor pattern 27 (positive type as shown in FIG. 2(b)). Thereafter, metal plating is performed by using a semi-additive process and the like to form conductor layers 28 along the above-mentioned conductor pattern 27. This condition is shown in FIG. 2(c). Examples of the metal used for the above-mentioned metal plating include Cu, Ni, Pb, Ag and the like. Particularly, Cu is preferable. Preferably, the thickness of the above-mentioned conductor layers 28 is 5 to 20 μm, particularly 10 to 12 μm.

Next, the dry film resist 24 on the opposite surfaces of the metal substrate 20 is stripped away by using an alkali aqueous solution (with reference to FIG. 2(d)). Then, an unnecessary portion of the seed layer 23 except where the conductor layers 28 are formed is removed by etching using an etchant such as an aqueous solution of ferrous chloride and the like (with reference to FIG. 3(a)). This provides a circuit board 30 in which the conductor layers 28 are formed on the first surface of the metal substrate 20, with the insulation layers 22 lying therebetween.

Figure 3:
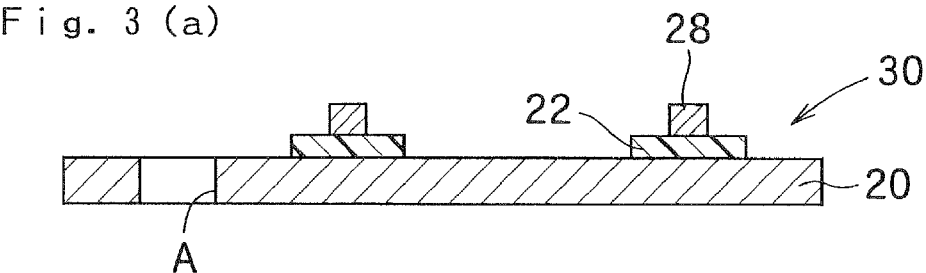
FIGS. 3(a) to (d) are illustrations schematically showing manufacturing steps of the above-mentioned optical waveguide device.
Figure 3:
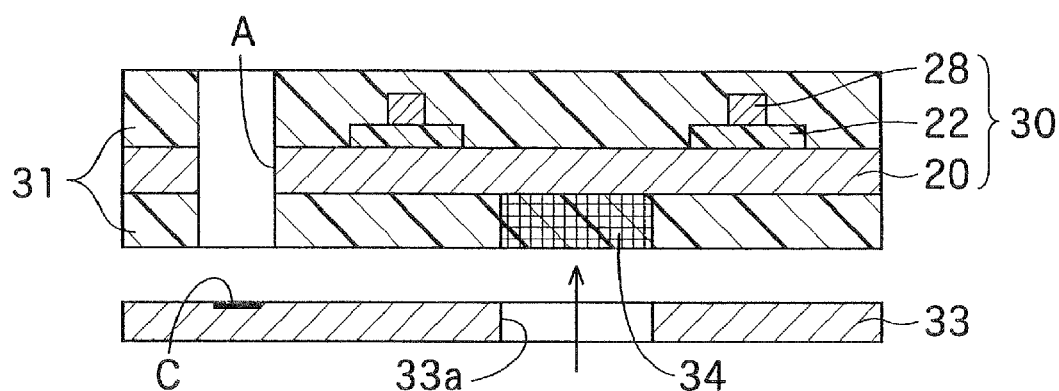
Figure 3:
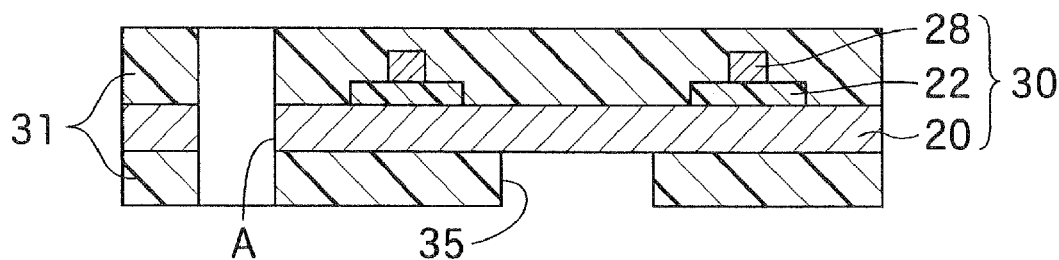
Figure 3:
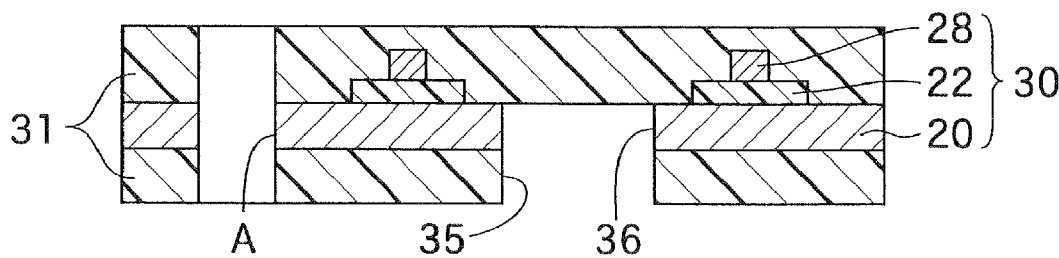

Next, a dry film resist (a third photosensitive resin layer) 31 is laminated again to the opposite surfaces of this circuit board 30. Thereafter, as shown in FIG. 3(b), the first surface of the circuit board 30 on which the insulation layers 22 and the conductor layers 28 described above are formed is exposed to light, with a third photomask 33 positioned relative to the first surface of the circuit board 30. This transfers a transfer pattern 33a (which is an opening pattern for optical coupling between the light-receiving and light-emitting elements and the optical waveguide) formed as an opening in the third photomask 33 onto the dry film resist 31. At this time, alignment is performed between the alignment mark A in the metal substrate 20 and an alignment mark C provided in the third photomask 33 to accomplish the precise positioning of the third photomask 33 relative to the metal substrate 20. A transferred portion 34 formed in the dry film resist 31 by the above-mentioned exposure to light is cross-hatched in FIG. 3(b).

A developing solution is used to dissolve away the above-mentioned transferred portion 34 in the dry film resist 31, thereby developing a recessed optical coupling opening pattern 35 (positive type), as shown in FIG. 3(c). Thereafter, etching is performed on the metal substrate 20 along the above-mentioned optical coupling opening pattern 35 by using an etchant such as ferrous chloride and the like, to thereby form an optical coupling opening 36. This condition is shown in FIG. 3(d).

Figure 4:
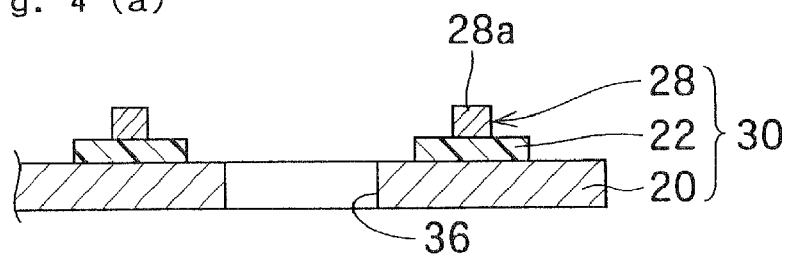
FIGS. 4(a) to (c) are illustrations schematically showing manufacturing steps of the above-mentioned optical waveguide device.
Figure 4:
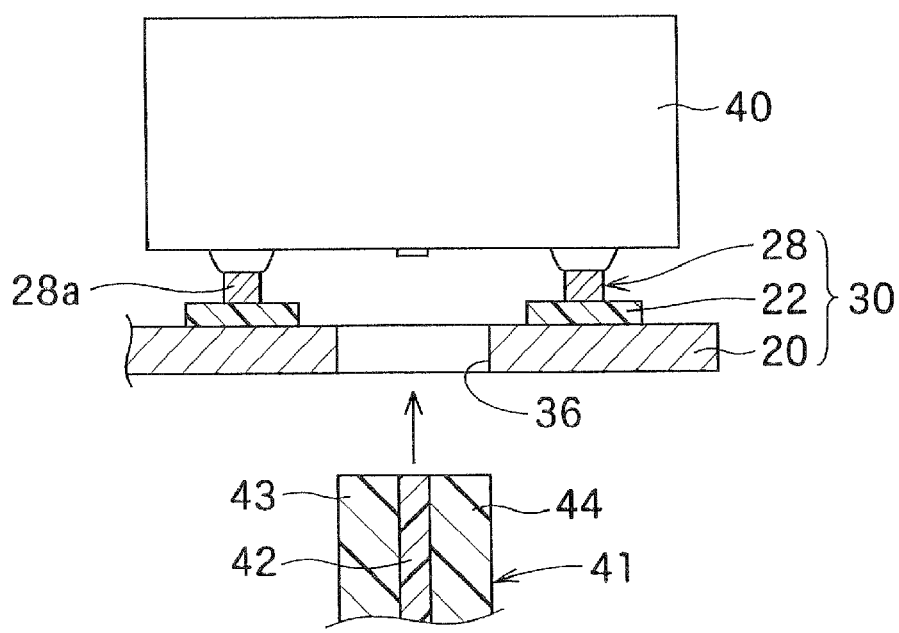
Figure 4:
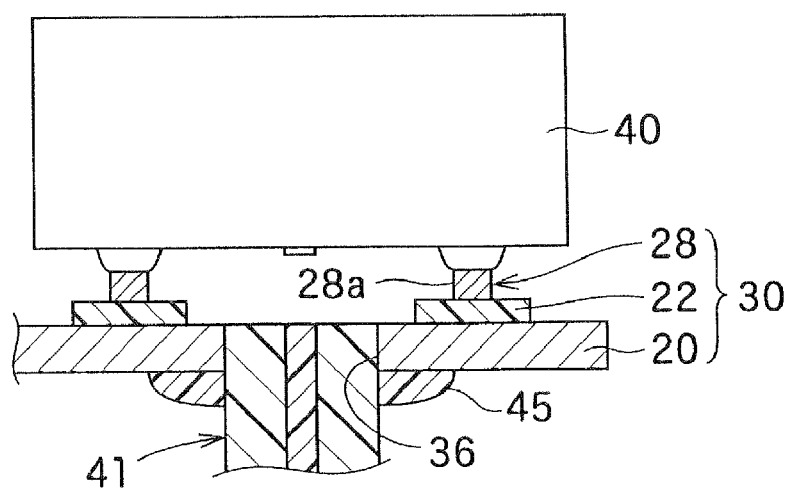

After the resultant structure is cleaned, the dry film resist 31 on the opposite sides of the metal substrate 20 is stripped away by using an alkali aqueous solution (with reference to FIG. 4(a)). Then, the resultant structure is cleaned again to prevent the occurrence of discoloration due to alkalization.

A predetermined plating process is performed on pads 28a for mounting the light-emitting element thereon in the conductor layers 28 of the obtained circuit board 30. Thereafter, a coverlay is formed in a predetermined location (not shown).

An appropriate method may be selected for the above-mentioned plating process in accordance with the configuration of the mounting of the light-emitting element to be mounted. For example, a plating process which is a combination of Ni-plating and Au-plating is preferably used. For the formation of the coverlay, it is generally easy and preferred to affix a coverlay film such as a polyimide film and the like having an adhesive layer on one surface thereof.

Next, a light-emitting element 40 is mounted on the pads 28a of the above-mentioned circuit board 30, and one end of an optical waveguide film 41 is inserted into and fixed in the optical coupling opening 36 formed in the above-mentioned circuit board 30 from the opposite side as indicated by an arrow in FIG. 4(b). This allows the optical coupling between the light-emitting element 40 and the optical waveguide film 41 to provide an intended optical waveguide device.

The mounting of the above-mentioned light-emitting element 40 is performed as appropriate depending on the type of the light-emitting element 40. As an example, Au bumps are previously formed on an element having electrodes and a light-emitting portion arranged in the same plane, and are connected to the pads 28a of the above-mentioned circuit board 30. The Au bumps and the pads 28a are fixed together using ultrasonic waves to accomplish flip-chip mounting.

An example of the optical waveguide film 41 for the optical coupling with the above-mentioned light-emitting element 40 is such that strip-shaped films 43 and 44 serving as cladding layers hold the opposite sides of a flexible core layer 42 extending in a longitudinal direction into an integral laminated configuration. In particular, the optical waveguide film 41 having a total thickness of about 0.1 to about 2 mm is preferably used.

An example of the method of fixing the above-mentioned optical waveguide film 41 in the optical coupling opening 36 of the circuit board 30 includes fixing the perimeter of the optical coupling opening 36 in which the above-mentioned optical waveguide film 41 is inserted with an ultraviolet curable adhesive 45, as shown in FIG. 4(c).

In the optical waveguide device thus obtained, the light-emitting element 40 and the optical waveguide of the optical wave guide film 41 fixed in the optical coupling opening 36 are optically coupled to each other while being positioned relative to each other with high accuracy by the photolithography using the alignment mark A formed in the metal substrate 20. This ensures the coaxial relationship between the optical axes of the light-emitting element 40 and the optical waveguide to achieve the transmission of light beams with high intensity.

The above-mentioned method of manufacturing the optical waveguide device is capable of efficiently manufacturing the optical waveguide device of high quality as mentioned above by using simple steps which are a combination of the photolithography and the opening formation such as etching and the like to produce high practical effects.

In the above-mentioned instance, the alignment mark A in the metal substrate 20 is formed as the through hole by the punching or blanking using a precision metal mold. The present invention, however, is not limited to this. For example, a notch may be formed in one end edge of the metal substrate 20 and be used as the alignment mark. Alternatively, a mark printed by an ink-jet technique and the like may be used as the alignment mark.

The above-mentioned instance is an instance of the manufacture of the optical waveguide device in which the light-emitting element 40 mounted on the circuit board 30 and one end of the optical waveguide film 41 are optically coupled to each other. The present invention, however, is similarly applicable to an instance in which a light-receiving element is used in place of the above-mentioned light-emitting element 40.

Further, the present invention is applicable to an instance in which the light-emitting element 40 mounted on the circuit board 30 and a light-receiving element mounted on a second circuit board prepared separately are connected to each other with the single optical waveguide film 41. Of course, the present invention is applicable to an instance in which the light-emitting element 40 and a light-receiving element are connected to each other with the optical waveguide film 41 on the same board.

In the above-mentioned instance, the optical waveguide film 41 is used as the optical waveguide for optical coupling. The above-mentioned optical waveguide film 41 may be a single-mode optical waveguide film provided with the single core layer 42 or be a multi-mode optical waveguide film including a plurality of core layers 42 arranged at a predetermined spacing and extending in parallel in the longitudinal direction. However, since the multi-mode optical waveguide film has a large width, it is necessary that the opening in the metal substrate 20 is in the form of an accordingly elongated slit.

As the optical waveguide for optical coupling, optical fibers and various optical transmission blocks in which an optical waveguide is formed in a rigid resin member may be used in place of the above-mentioned optical waveguide film 41.

Further, the present invention is not limited to an instance in which one end of the optical waveguide film 41 is directly fixed in the optical coupling opening 36 formed in the circuit board 30. For example, the present invention is applicable to an instance in which the optical waveguide film 41 provided with an MT connector (including an RMT connector) 50 at one end or at opposite ends thereof is used, for example, as shown in FIG. 5(*a*), and an optical waveguide device is obtained by attaching the above-mentioned MT connector 50 to the circuit board 30.

Figure 5:
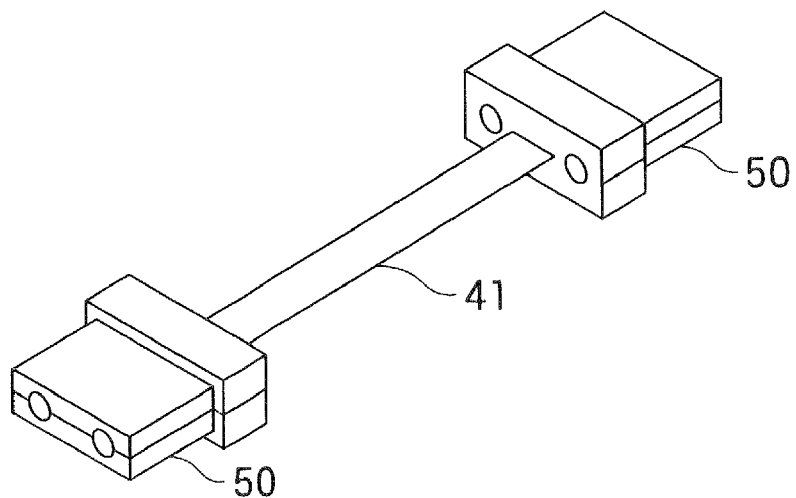
FIG. 5(a) is an illustration of an optical waveguide connector usable for another exemplary manufacturing method of an optical waveguide device according to the present invention.
FIG. 5(b) is an illustration schematically showing the step of attaching the above-mentioned optical waveguide connector.
Figure 5:
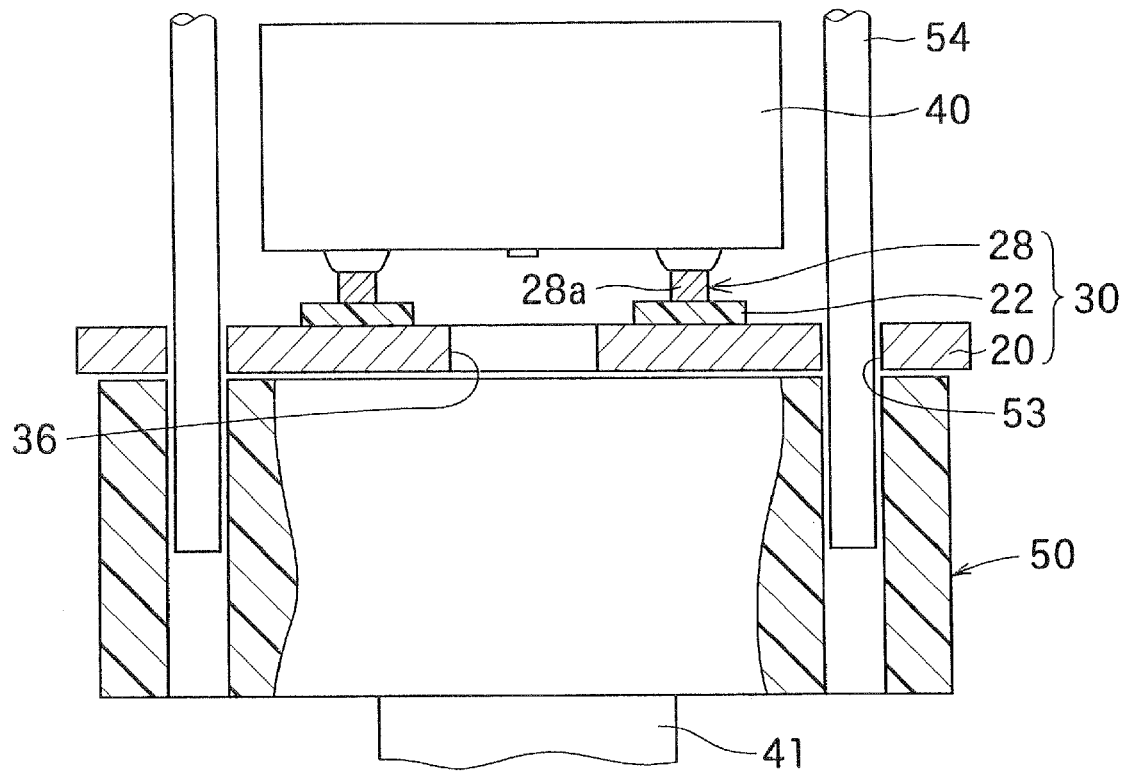
Figure 6:
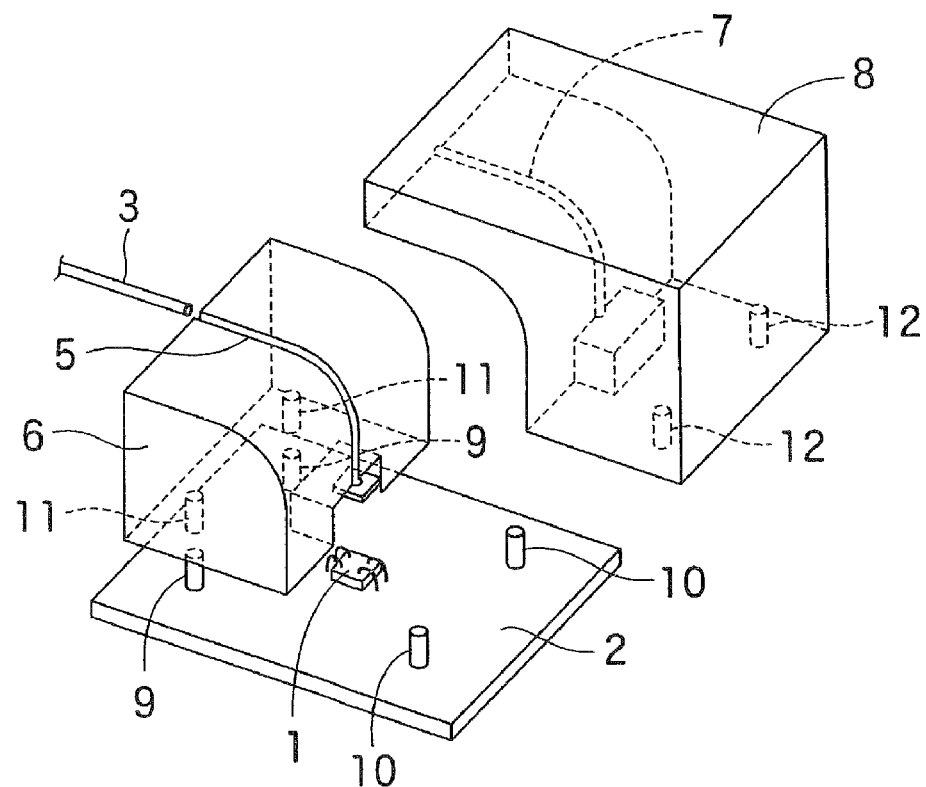
FIG. 6 is an illustration showing an example of a conventional optical waveguide device having a receptacle structure.

Specifically, the above-mentioned MT connector 50 is designed to be attached to another MT connector or a board with pins specifically designed for connector attachment by using two positioning holes formed in an end surface thereof and positioning holes provided in a counterpart to be attached thereto (with reference to FIG. 5(*b*)). Thus, when the same method as the method of formation of the optical coupling opening 36 in the above-mentioned metal substrate 20 (that is, the transfer of the opening pattern by the photolithography plus the etching of the metal substrate 20) is used to form the positioning holes for the attachment of the specifically designed pins described above in the metal substrate 20 at the same time as the above-mentioned optical coupling opening 36, the above-mentioned positioning holes are formed while being precisely positioned relative to the metal substrate 20.

Therefore, the use of the positioning holes accomplishes the attachment of the MT connector 50 and the optical coupling between the optical waveguide film 41 connected to the MT connector 50 and the light-emitting element 40, with the MT connector 50 precisely positioned relative to the light-emitting element 40 mounted on the circuit board 30, as shown in FIG. 5(*b*). In the figure, the reference numeral 53 designates the positioning holes formed in the metal substrate 20, and 54 designates the specifically designed pins.

EXAMPLES

Example 1

A photosensitive polyimide having a thickness of 10 μm was applied on to an SUS substrate having a thickness of 25 μm. Thereafter, a future insulation layer portion was exposed to light by using a photomask. Thus, a difference was made in solubility between the polyimide in an exposed portion and the polyimide in an unexposed portion by lower-layer PEB. Then, the unexposed portion was removed by using a developing solution. Thereafter, polyimide cure was performed by heating, and the cured exposed portion functioned as an insulation layer.

Next, a sputtering apparatus was used to form a Cu/NiCr seed layer (having a Cu thickness of 0.15 μm and a NiCr thickness of 0.15 μm) for Cu plating. Thereafter, a punching or blanking process using a precision metal mold was performed on the above-mentioned SUS substrate to form an alignment mark (through hole) for photomask alignment.

Then, a dry film resist (DFR) was laminated to opposite surfaces of the SUS substrate formed with the above-mentioned insulation layer. The above-mentioned alignment mark was used to align a second photomask with the dry film resist formed on a first surface of the SUS substrate on which the insulation layer was formed. Exposure to light and development using photolithography were performed to remove an exposed portion of the dry film resist, thereby forming a conductor pattern including pads for mounting a light-receiving or light-emitting element thereon, electrical interconnect lines and the like. Cu plating was performed along this conductor pattern by using a semi-additive process to form a conductor layer having a thickness of 10 to 12 μm. Then, an alkali aqueous solution was used to strip a way the dry film resist from the opposite surfaces. This provided a circuit board in which the conductor layer was formed on the SUS substrate, with the insulation layer therebetween.

Next, an unnecessary portion of the seed layer except where the conductor layer was formed was removed by etching using an aqueous solution of ferrous chloride. Thereafter, a dry film resist was laminated again to the opposite surfaces of the above-mentioned circuit board. The alignment mark provided in the above-mentioned SUS substrate was used to align a photomask with the dry film resist on a second surface of the SUS substrate opposite from the first surface on which the insulation layer and the conductor layer were formed. Exposure to light and development using photolithography were performed to remove an exposed portion of the dry film resist, thereby forming an optical coupling opening pattern. Etching using ferrous chloride was performed along this opening pattern to remove the SUS substrate, thereby forming an optical coupling opening. This optical coupling opening was formed with high accuracy such that variations in dimension were ±5 μm.

After the circuit board formed with the above-mentioned optical coupling opening was cleaned, a plating process (Ni plating with a thickness of 5 μm and Au plating with a thickness of 0.2 μm) required for the mounting of a light-emitting element was performed on the pads of the conductor layer. Then, a coverlay film which was a polyimide film was affixed to a predetermined location. Thereafter, an element having electrodes and light-emitting and light-receiving portions arranged in the same plane was flip-chip mounted on this circuit board. A VCSEL (having a wavelength of 850 nm) manufactured by U-L-M photonics GmbH) was used as the light-emitting element, and a GaAs photodiode manufactured by Albis Optoelectronics AG was used as the light-receiving element. Au bumps were previously formed on these elements and were joined by ultrasonic waves to accomplish the mounting.

An optical waveguide film accurately cut to a predetermined width (a multi-mode optical waveguide film including three optical waveguides arranged at a spacing such that Line/Space=50 μm/200 μm, and each having a thickness of 0.1 mm, a width of 3 mm and a core size of 50 μm by 50 μm) was inserted into an opening (in the form of a 0.105 mm by 3.005 mm slit) of the circuit board and fixed with an ultraviolet curable adhesive.

It was found that the light-emitting element and optical waveguide film optically coupled to each other in this manner and the light-receiving element and optical waveguide film optically coupled to each other in this manner had respective optical axes coupled to each other with accumulated tolerances of approximately ±10 μm to accomplish fully passive alignment with an optical loss of not greater than 1 dB.

Example 2

A circuit board was produced in which a conductor layer (from which an unnecessary portion of a seed layer was removed) was formed on an SUS substrate, with an insulation layer therebetween, in a manner similar to that in Example 1 described above. Then, a dry film resist was laminated to opposite surfaces of the above-mentioned circuit board. An alignment mark provided in the above-mentioned SUS substrate was used to align a photomask with the dry film resist on a surface of the SUS substrate opposite from the surface on which the insulation layer and the conductor layer were formed. Exposure to light and development using photolithography were performed to remove an exposed portion of the dry film resist. This formed an optical coupling opening pattern and an opening pattern to be formed into (a pair of) positioning holes for PMT connector attachment in precise positional relationship with pads on which an element was to be mounted.

Etching using ferrous chloride was performed along the above-mentioned opening patterns to remove the SUS substrate, thereby forming an optical coupling opening and the positioning holes for PMT connector attachment. The above-mentioned optical coupling opening was formed with high accuracy such that variations in dimension were ±5 μm. The accuracy of spacing between the two positioning holes described above was high accuracy of ±5 μm. After the circuit board formed with the above-mentioned optical coupling opening and the positioning holes was cleaned, the light-emitting element similar to that in Example 1 described above was flip-chip mounted on the circuit board in a manner similar to that in Example 1.

On the other hand, an optical waveguide film of a predetermined size was set in a PMT connector (a connector for an optical waveguide film) manufactured by NTT Advanced Technology Corporation. Then, pins specifically designed for PMT connector attachment were inserted into the positioning holes formed in the above-mentioned circuit board and positioning holes provided in a body of the above-mentioned PMT connector. Thus, with the above-mentioned PMT connector aligned in a predetermined position of the circuit board, the specifically designed pins were fixed with an ultraviolet curable adhesive. It was found that the light-emitting element on the circuit board and the optical waveguide film to be attached thereto through the above-mentioned PMT connector had respective optical axes coupled to each other with accumulated tolerances of approximately +10 μm to accomplish fully passive alignment with an optical loss of not greater than 1 dB.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A method of manufacturing an optical waveguide device, comprising the steps of:

forming a through hole as an alignment mark for photomask alignment in a metal substrate having a first surface with insulation layers in a predetermined pattern formed thereon, the through hole being punched through the metal substrate;

coating the first surface of said metal substrate with a first photosensitive resin layer;

preparing a first photomask with an alignment mark and aligning the alignment mark of the first photomask and the alignment mark formed in the metal substrate to thereby expose the coated surface to light with said first photomask positioned relative to the coated surface of the first photosensitive resin layer of the metal substrate and developing the coated surface, to transfer a conductor pattern including pads for mounting of light-receiving and light-emitting elements onto said first photosensitive resin layer, thereby removing an unnecessary portion of said first photosensitive resin layer;

forming a conductor layer along the conductor pattern uncovered by the removal of the unnecessary portion of said first photosensitive resin layer;

coating a second surface of said metal substrate opposite from the first surface with a second photosensitive resin layer;

preparing a second photomask with an alignment mark and aligning the alignment mark of the second photomask and the alignment mark formed in the metal substrate to thereby expose the coated surface to light with said second photomask positioned relative to the coated surface of the second photosensitive resin layer of the metal substrate and developing the coated surface, to transfer an optical coupling opening pattern onto said second photosensitive resin layer, thereby removing an unnecessary portion of said second photosensitive resin layer; and performing an opening formation process on the metal substrate along the optical coupling opening pattern uncovered by the removal of the unnecessary portion of said second photosensitive resin layer to form an optical coupling opening, wherein, after the light-receiving and light-emitting elements are mounted on the pads of said conductor layer, said light-receiving and light-emitting elements and an optical waveguide are optically coupled to each other by using said optical coupling opening and by fixing one end of the optical waveguide at the optical waveguide coupling opening formed portion.

2. A method of manufacturing an optical waveguide device according to claim 1, wherein a multi-mode optical waveguide film is used as said optical waveguide, and a slit-shaped opening is formed as said optical coupling opening; and wherein, after the light-receiving and light-emitting elements are mounted on the pads of said conductor layer, one end of said multi-mode optical waveguide film is inserted into and fixed in said slit-shaped optical coupling opening, whereby said light-receiving and light-emitting elements and the optical waveguide are optically coupled to each other.

3. A method of manufacturing an optical waveguide device according to claim 1,
wherein an optical waveguide film having an end portion provided with an MT connector is used as said optical waveguide, and a through hole for receiving a pin specifically designed for attachment of said MT connector is formed in a manner similar to the formation of said optical coupling opening at the same time as the optical coupling opening; and wherein, after the light-receiving and light-emitting elements are mounted on the pads on said metal substrate, the pin specifically designed for attachment of said MT connector is inserted into said through hole to attach and fix the MT connector, whereby said light-receiving and light-emitting elements and the optical waveguide are optically coupled to each other.

4. A method of manufacturing an optical waveguide device according to claim 1, wherein the remaining portion of said first photosensitive layer is removed after forming said conductive layer.

5. A method of manufacturing an optical waveguide device according to claim 1, wherein the remaining portions of said second photosensitive layer is removed after forming said optical coupling opening.

* * * * *